INVENTOR.
LESLIE E. SODERQUIST
BY Hamilton & Cook
ATTORNEYS

INVENTOR.
LESLIE E. SODERQUIST
BY Hamilton & Cook
ATTORNEYS

Aug. 22, 1967 L. E. SODERQUIST 3,336,635
PRESS FOR SHAPING AND CURING PNEUMATIC TIRES
Filed Oct. 23, 1965 12 Sheets-Sheet 8

INVENTOR.
LESLIE E. SODERQUIST
BY Hamilton Cook

ATTORNEYS

INVENTOR.
LESLIE E. SODERQUIST
BY Hamilton & Cook
ATTORNEYS

INVENTOR.
LESLIE E. SODERQUIST
BY *Hamilton Hook*

ATTORNEYS

INVENTOR.
LESLIE E. SODERQUIST
BY
ATTORNEYS

United States Patent Office 3,336,635
Patented Aug. 22, 1967

3,336,635
PRESS FOR SHAPING AND CURING PNEUMATIC TIRES
Leslie E. Soderquist, Silver Lake, Ohio, assignor to McNeil Corporation, Akron, Ohio, a corporation of Ohio
Filed Oct. 23, 1965, Ser. No. 503,833
13 Claims. (Cl. 18—17)

The present invention relates to tire presses for shaping and curing unvulcanized tire bands having circular beads within opposed separable or relatively movable top or upper and bottom or lower mold sections or halves. More particularly, the invention relates to a permanent bag center mechanism carried by and extending axially from a mold section. The center mechanism shapes the tire band during closing of the mold sections, the tire band is cured when the mold sections are closed, and, while the press is opening by relative movement of the mold sections, the cured tire is stripped from the mold section carrying the center mechanism by selective and controlled increase of the diameter of a portion of the permanent bag which is between the tire beads or which is adjacent or near the opposed mold section.

Center mechanisms for a tire curing press according to the invention have a permanent bag in the form of a deformable and radially distensible cylinder open at both ends. The ends of the bag are closed by opposed first and second assemblies. The first assembly is movable longitudinally toward and away from the second assembly which is integrally associated with a mold section. Interiorly of the bag, a plurality of radially movable elements such as sectorial segments are carried on the surface of the first assembly which faces the second assembly. Also in the interior of the bag is an actuator element for selectively moving the radially movable elements to increase the effective diameter of that portion of the bag adjacent the first assembly.

These center mechanism elements as just described and their relation to the opposed mold sections are generally equivalent to elements disclosed in a prior copending application of the inventor Soderquist, application Ser. No. 341,999, filed Feb. 3, 1964, now Patent No. 3,260,782.

The earlier center mechanism of Soderquist application Ser. No. 341,999 and the improved center mechanism according to the invention, as disclosed and shown herein, are both intended for use in a press having opposed separable mold sections and a permanent bag center mechanism carried by and extending axially of one of the mold sections. Both the earlier and the improved center mechanism may be used to practice a method of press operation, for removing a cured tire from such a press, comprising, opening the press by relative movement of the mold sections, maintaining the diameter of a portion of the bag which is between the beads of a tire at a dimension greater than the diameter of the beads of the tire whereby the tire is stripped from the mold sections, and removing the cured tire from the press after decreasing the diameter of the entire bag to a dimension less than the diameter of the beads of the tire.

Advantages of a press having a center mechanism according to the invention are many. Because the second or lower center ring-bead ring assembly is not elevated to strip a cured tire from the lower mold, the lower bead ring which is specially contoured to form the radially innermost portions of the lower bead of the cured tire may be integral with adjacent portions of the mold matrix. When the bead ring is mechanically integral with the adjacent mold the outer side of the bead area of the tire will not have a "rind" or flash.

Another advantage of the center mechanism according to the invention is that when the first or upper plate ring-clamp ring assembly is moved away from the lower center ring-bead ring assembly, the force or pressure to strip the cured tire from the mold section is applied radially outwardly against the bead area opposite to the bead area still in the mold. During the stripping operation, as the beads are spread apart, the diameter of the tread portion of the tire is reduced facilitating withdrawal from the mold matrix and reducing the possibility of what is known in the art as "hot tear."

As shown, the novel elements of the present invention include a housing extending into the press base from beneath a lower mold section. Within the housing are two parallel upwardly extending shafts. A primary shaft is located coaxial of the lower mold section and raises and lowers the upper plate ring-clamp ring assembly. A secondary shaft is located to the side of the primary shaft and is connected to the actuator element for moving the radially movable elements which increase the effective diameter of the bag. Both shafts are selectively moved by a unitary or common mechanical drive mechanism extending transversely of the housing to the front of the press immediately below the lower mold section.

Another advantage of the center mechanism according to the invention is the capability thereof for shaping and curing tire bands which are either of a conventional drum or bias built carcass or the recently adapted radial ply construction. During the shaping operation, the primary shaft may be precisely controlled by elements of the center mechanism so that the upper plate ring-clamp ring assembly is positioned in an exact predetermined relation to the upper bead of the uncured tire band. The control elements for governing movement of the primary shaft, and therefore determining the position of the bag within the uncured tire band during the shaping thereof, are located at the front of the press and readily accessible for change or adjustment by the operator.

Still another advantage of the center mechanism according to the invention relates to the mounting of the lower mold section on the press base. The center mechanism has elements thereon for releasably clamping the lower mold sections to the press. These elements are also located at the front of the press and are readily accessible and usable.

The general object of the present invention is to improve the operating efficiency of presses for shaping and curing unvulcanized tire bands.

It is a specific object to provide a permanent bag center mechanism for a tire press wherein one of the assemblies engaging and closing the open ends of the bag remains stationary and integrally associated with the adjacent mold during the operation of stripping the cured tire from the mold sections.

It is a further object to provide a center mechanism wherein a portion of the permanent bag may be selectively increased in diameter in a controlled manner for "pulling," rather than "pushing," the cured tire during the operation of stripping from the mold sections.

Still another object is to provide a center mechanism wherein the movement of the permanent bag, during the operation of stripping the cured tire from the mold sections, removing the cured tire from the press, loading, shaping and curing an uncured tire band, is achieved by the use of mechanical elements, as distinguished from the mechanical-hydraulic elements of prior art constructions, such as disclosed in the copending application Ser. No. 341,999.

Still another object of the invention is to provide a "Universal press" that is readily and easily adaptable to handle the proliferation of tire sizes required by today's market.

These and other objects of the invention, and additional advantages over prior and earlier presses and center mechanisms will be apparent in view of the following detailed description and the attached drawings.

Figure 14:
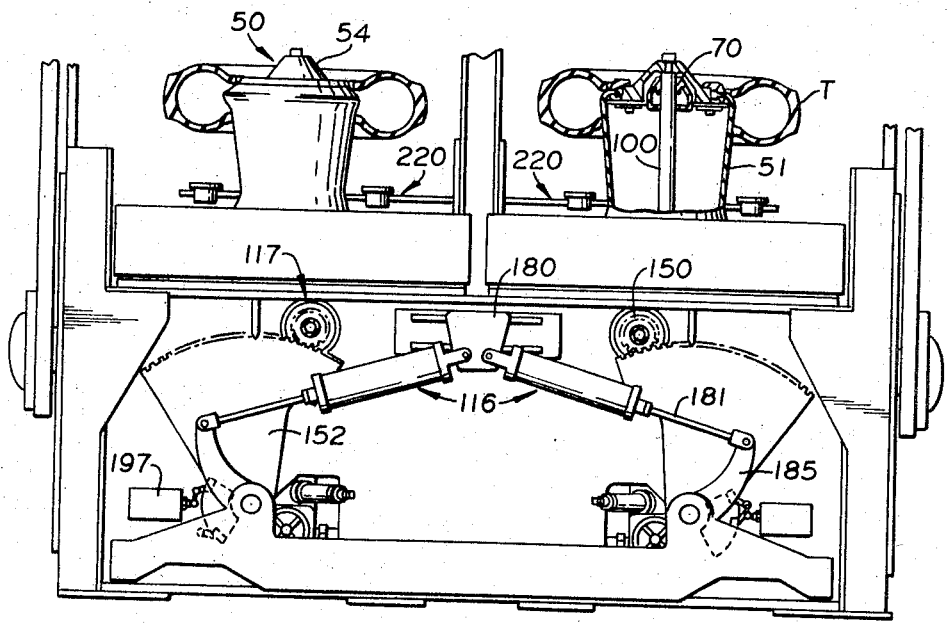
FIGS. 14–17 are sequential views illustrating various uses and operating positions for the center mechanisms according to the invention, with—

FIG. 14 showing the pressed opened by relative movement of the mold sections and with the cured tires having been stripped from the mold sections by maintaining the diameter of the permanent bags at a dimension greater than the diameter of the beads of the tire; with—

Figure 15:
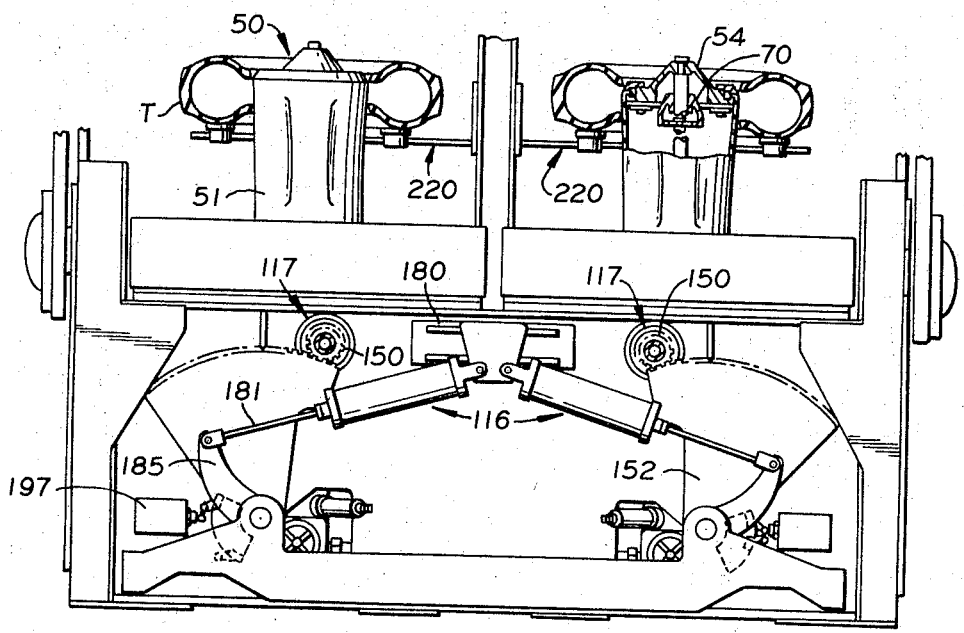

FIG. 15 showing the cured tires ready for removal from the center mechanism and discharge from the press after decreasing the diameter of each permanent bag to a dimension less than the diameter of the beads of the tire; with—

Figure 16:
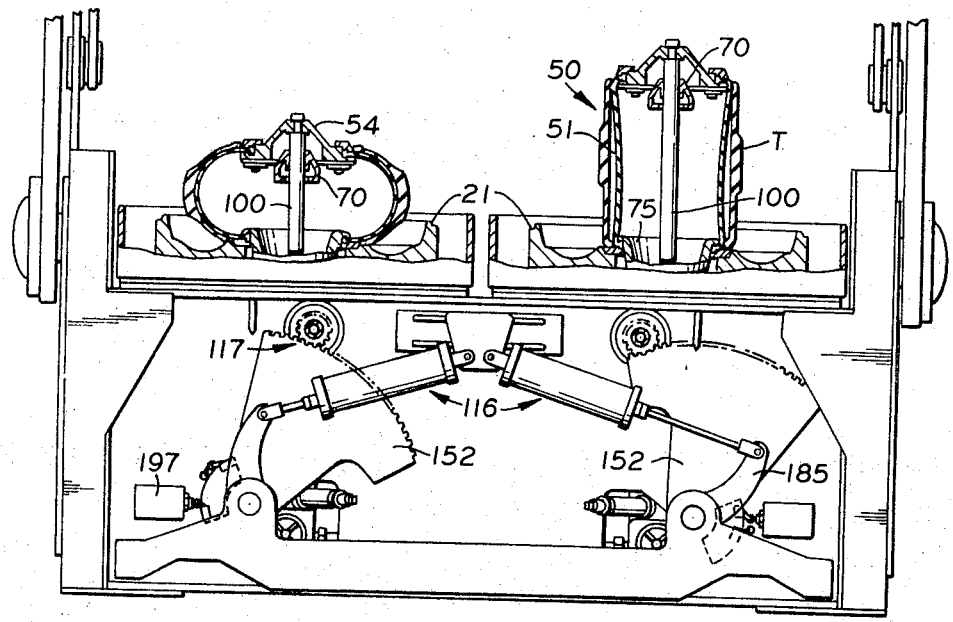

FIG. 16 showing uncured tired bands having been loaded into the press, the left hand mold section having been loaded with a radial ply tire band, the right mold section having been loaded with a conventional bias ply tire band; and with—

Figure 17:
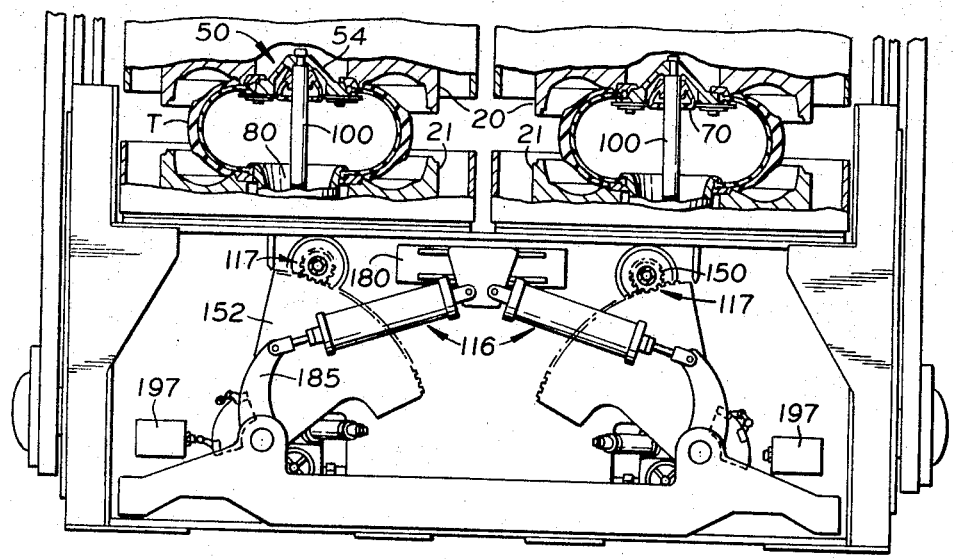

FIG. 17 showing the two tires of FIG. 16, in the intermediate position during final shaping, just prior to full press closing and tire curing.

*General description*

Figure 1:
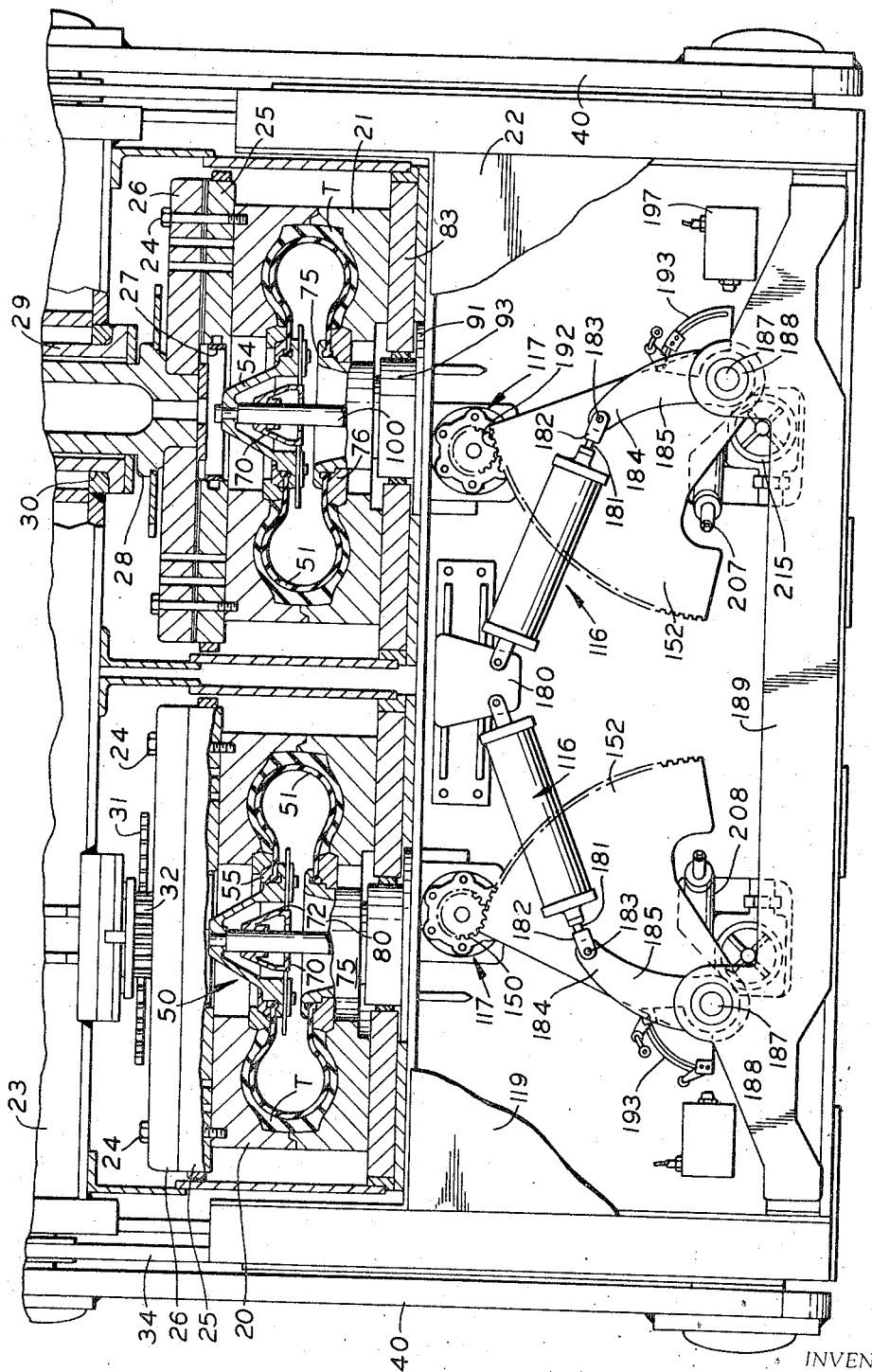
FIG. 1 is a front view of a dual tire press having a center mechanism according to the invention for each pair of opposed and separable mold sections.

Referring to FIG. 1, a tire curing press suitable for practice of the invention has separable upper and lower mold sections, 20 and 21. The lower or stationary mold sections 21 are securely mounted on the press base 22 by elements associated with the center mechanism, as described in detail below. The upper or movable mold sections 20 are carried on a heavy cross beam 23. The mold sections 20 are attached, as by bolts 24, to a platen assembly provided by a lower platen 25 and an upper platen 26. The center or axial portion of the lower platen 25 is cored out or relieved as at 27 to receive the uppermost portions of the center mechanism.

The upper platen 26 is securely attached to the lower end of an adjusting sleeve 28. The sleeve 28 is carried within a ring 29 securely attached as at 30 to a bore in the underside of a cross beam 23. Suitable adjusting means such as a ring gear 31 attached to the sleeve 28, and a pinion 32 rotatably mounted on the upper side of the upper platen 26, may be provided to adjust the press for different mold sections of varying thickness.

Figure 2:
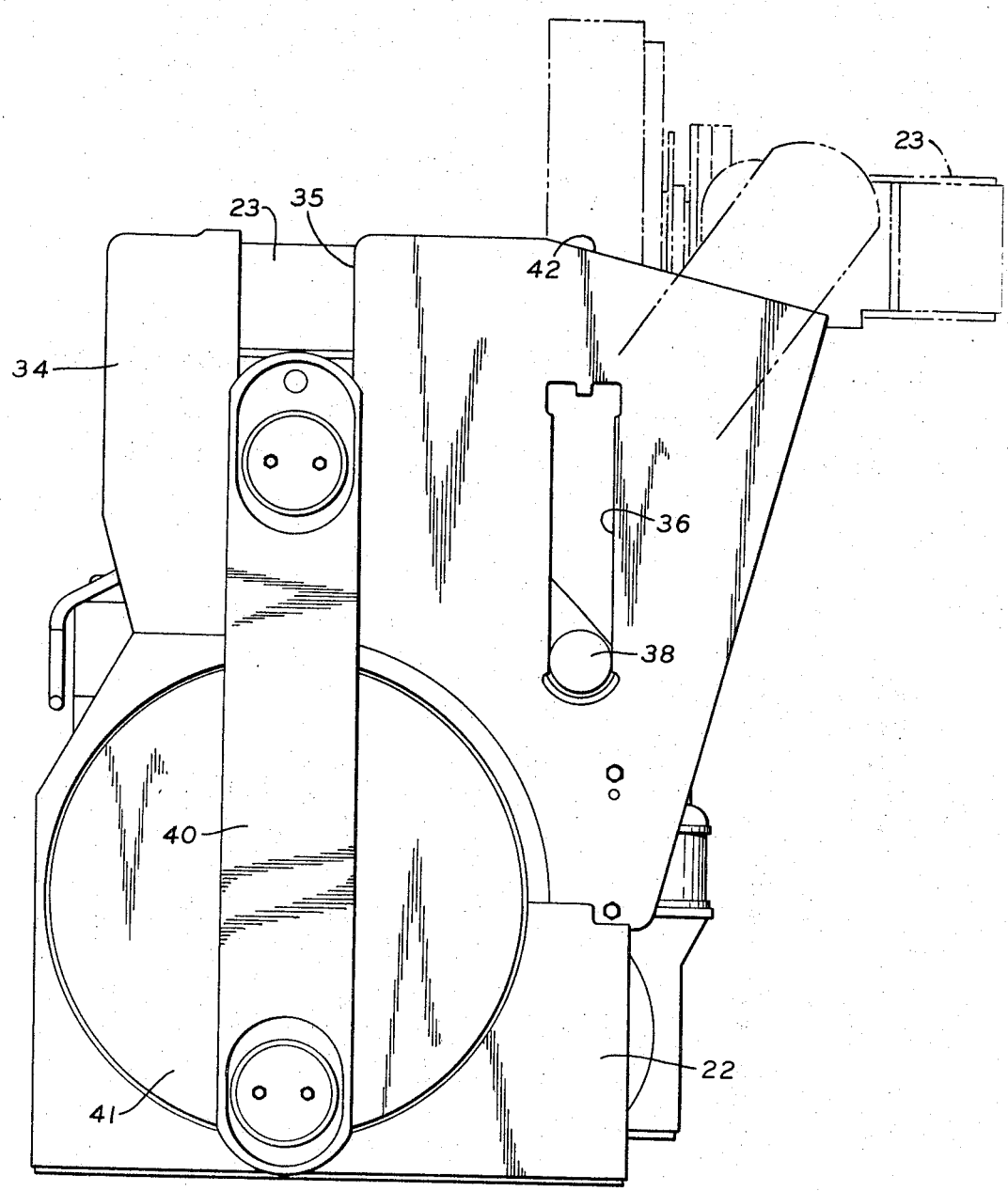
FIG. 2 is a side view of a dual tire press suitable for use of the invention.

Referring also to FIG. 2, on opposite sides of the lower mold sections 21 are guide plates 34 extending upwardly from the base 22. Each guide plate 34 has two parallel front and rear guideways 35 and 36. At each end of the cross beam are guiding arms having front and rear rollers (the rear roller only being shown and indicated at 38) receivable in the respective guideways 35 and 36. The cross beam 23 is pivoted to the upper end of a pair of operating links 40 on opposite sides of the press and outside of the guide plates 34. The links 40 are actuated by large motor driven bull gears 41 to raise the cross beam. During the opening movement, the rollers first move to the upper end of their guideways 35 and 36. Then, the front rollers move along a backwardly and downwardly inclined surface 42 on the guide plates 34 while the rear rollers 38 move downwardly in the rear guideways 36 until the cross beam 23 is positioned over top of the guide plates 34.

Press elements 20–42, described above, are shown in a number of prior art patents to the inventor, including United States Patent No. 2,808,618, to which reference is made for such detail of presses as are required to more fully understand the invention.

The center mechanisms used in a press as generally described above are indicated in their entirety by the numeral 50. The permanent bag, bladder or diaphragm 51 of the center mechanism is an elongate, deformable, radially distensible but heavy walled cylinder open at both the upper and lower ends. The bag 51 is manufactured from rubber, rubberized fabric or similar suitable materials known to the art, in a bag mold. It is preferred that the bag mold be designed so that the finished bag though cylindrical is also somewhat barrel shaped; that is, has a slightly enlarged medial portion so that the bag in use and when elongated (the condition of FIG. 15) will collapse in four or more convolutions or folds.

Referring to the drawings, the side wall of the bag 51 is of substantially uniform thickness. The exterior surface of the side wall may be suitably ribbed, grooved or engraved in a known manner to facilitate exhaust of entrapped air between the tire band and the expanding bag during shaping. The end portions 53 of the bag are suitably shaped for secure engagement by the first and second clamping and closing assemblies.

Figure 11:
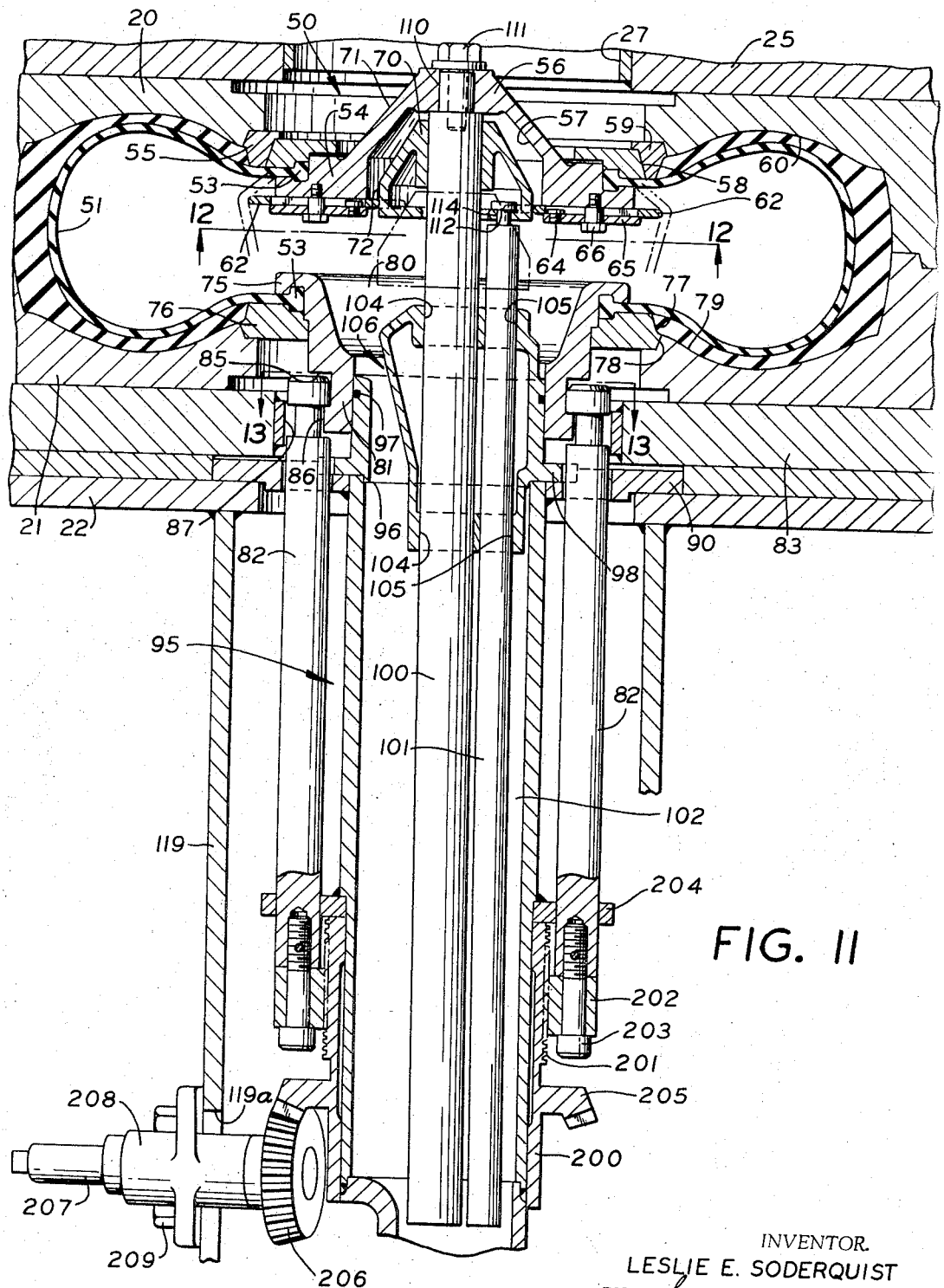
FIG. 11 is a sectional view, taken from the same side as FIG. 5, showing the press mold sections closed with the center mechanism in the operative position for curing of a tire.

As best shown in FIG. 11, the upper end of the bag 51 is closed and clamped by a "first assembly" of a lower plate ring 54 and an upper clamp ring 55 having suitably shaped circular grooves for engaging the end portion 53 of the bag. For the purpose of bag change or replacement, the clamp ring 55 may be removably attached to the plate ring 54 by any suitable means.

The plate ring 54 is a circular member having a diameter less than the smallest diameter of an uncured tire band or a cured tire. The plate ring 54 has a hub portion 56 with an axial bore. The axial bore through the plate ring hub 56 has an upper portion for securely receiving an end portion of an elongate "primary" shaft, as described in detail below. The axial bore through the plate ring hub 56 also has an enlarged recess portion 57 to accommodate or enclose an actuator element for increasing the diameter of the bag 51 during the stripping operation.

The clamp ring 55 is a member having a diameter which is preferably less than the smallest diameter of an uncured tire band. The radially outer portion 58 of the clamp ring is suitably machined or shaped to be received within the bore of a bead ring 59, specially contoured to form the bead area of the tire during shaping and curing. The bead ring 59 is mechanically integral with the adjacent molding surfaces 60 of the mold section 20.

As used in certain of the claims set forth below, the term "first assembly" refers to the assembly of a plate ring 54 and a clamp ring 55 but is not intended to be limited to the disclosure of elements 54 and 55 as being mounted so as to be movably associated with only a bead ring 59 of an upper mold section 20.

Figure 12:
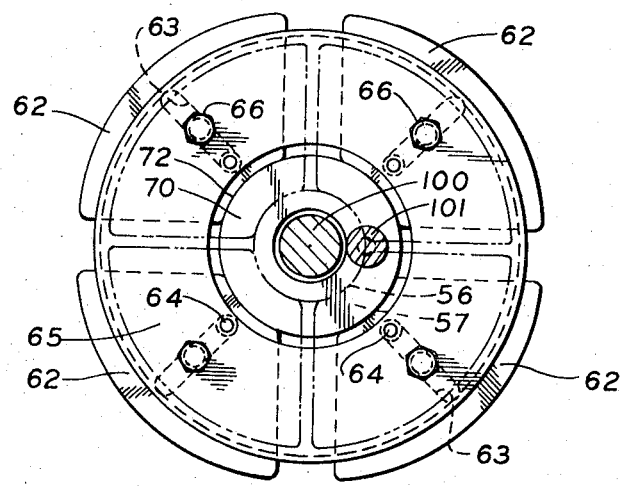
FIG. 12 is a plan view, taken substantially as indicated on line 12—12 of FIG. 11, showing details of the sectorial segments carried by the first or upper plate ring-clamp ring assembly.

Referring also to FIG. 12, adjacent the under surface of the plate ring 54 are a plurality of radially movable elements or sectorial segments 62. When moved radially outwardly, the sectorial segments 62 will increase or expand the diameter of the bag 51 to a dimension greater than the smallest collapsed diameter dimension (as shown by the chain lines in FIG. 11) of a cured tire. The movement of each segment is guided by a radially extending track or means such as an elongate slot 63 and a guide pin 64 inserted through a slot into the plate ring 54. The segments 62 are retained and stabilized in relation to the plate ring 54 by a circular ring member 65 held by a series of bolts and washers 66 inserted into the plate ring slots 63.

As shown, there are four segments 62 each being generally pie-slice shaped. However, the number of segments could vary so long as each segment has a track means such that the segments may be moved outwardly interiorly of or within the bag 51, to establish an "effective diameter" sufficient to accomplish the tire stripping operation.

The segments 62 may be moved radially outwardly to expand the bag 51 of the center mechanism by an actuator means or element 70. As shown, the actuator 70 is a plug or bullet-shaped member having a conical upper surface 71 for sliding contact with the radially inner ends of the segments 62. The lower surface 72 of the actuator 70 is uniformly cylindrical, preferably having a slight conical taper, but also having a predetermined diameter in relation to the segments 62.

The lower end of the bag 51 is closed, axially of the lower mold section 21, by a "second assembly" of an upper center ring 75 and a lower bead ring 76 having suitably shaped circular grooves for engaging the lower end portion 53 of the bag. The center ring 75 is a circular member having a diameter less than the smallest diameter of an uncured tire band or a cured tire; preferably having the same diameter as the upper plate ring 54.

The bead ring 76 is a circular member with a large diameter center opening, having a diameter slightly greater than the diameter of the center ring 75 and a radially outer portion 77 which is specially contoured to form a bead area of the tire during shaping and curing. Axially of portion 77 the bead ring 76 may have another circumferential portion 78 machined or shaped as required to provide a high tolerance or a close proximity fit with the adjacent molding surfaces or matrix 79 to the mold section 21.

As used in certain of the claims set forth below, the term "second assembly" refers to the assembly of a plate ring 75 and a bead ring 76 but is not intended to be limited to the disclosure of elements 75 and 76 as being mounted so as to be integrally associated with only a lower mold section 21.

The elements as just described above and designated by numerals in the series 51–79, including the center ring 75 but only to the extent of the closing function on the bag end 53, are generally equivalent to elements similarly described in the disclosure of the prior copending Soderquist application Ser. No. 341,999.

*The improved center mechanism*

The center ring 75 of the "second assembly" has an axial portion 80 which extends downwardly toward the press base 22 through the opening in the circular bead ring 76. As best shown in FIG. 11, the center ring portion 80 has sloping or curving sides forming a basin or center well axially of the lower mold section 21. At the end of a press curing cycle, the condensate from the curing media will flow into the basin 80 during the stripping operation. The basin 80 drains into the interior of the center mechanism housing through an axial opening defined by the interior surface of the lower portion 81 of the center ring 75.

Figure 13:
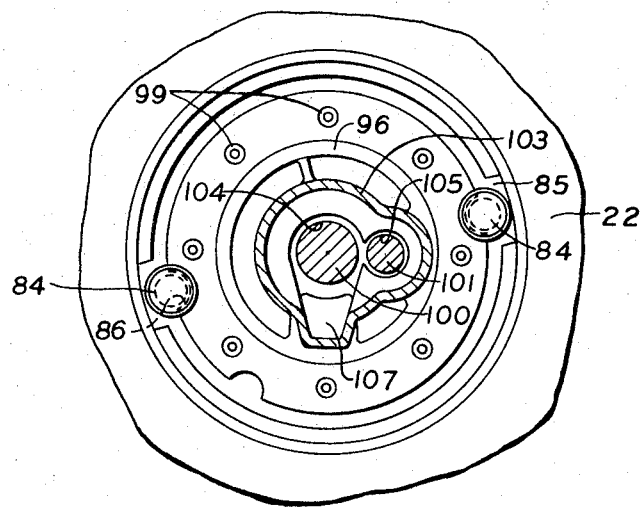
FIG. 13 is another plan view, taken substantially as indicated on line 13—13 of FIG. 11.

The exterior surface of the center ring lower portion 81 is adapted to releasingly engage upwardly extending rods 82 for clamping the center ring 75 in bag closing engagement with the bead ring 76. The clamp rods 82 may also be used to securely hold the bottom mold section 21 atop the mold platen 83 which is mounted on the press base 22. Referring also to FIG. 13, the upper head 84 of each clamp rod 82 is received within a circular groove 85 on the center ring lower portion 81. The groove 85 is notched as at 86 to permit the rod heads 84 to be inserted in the circular groove 85. The center or axial portion of the lower platen 83 is cored out or relieved as at 87 to receive the middle portion of the center mechanism 50.

Figure 5:
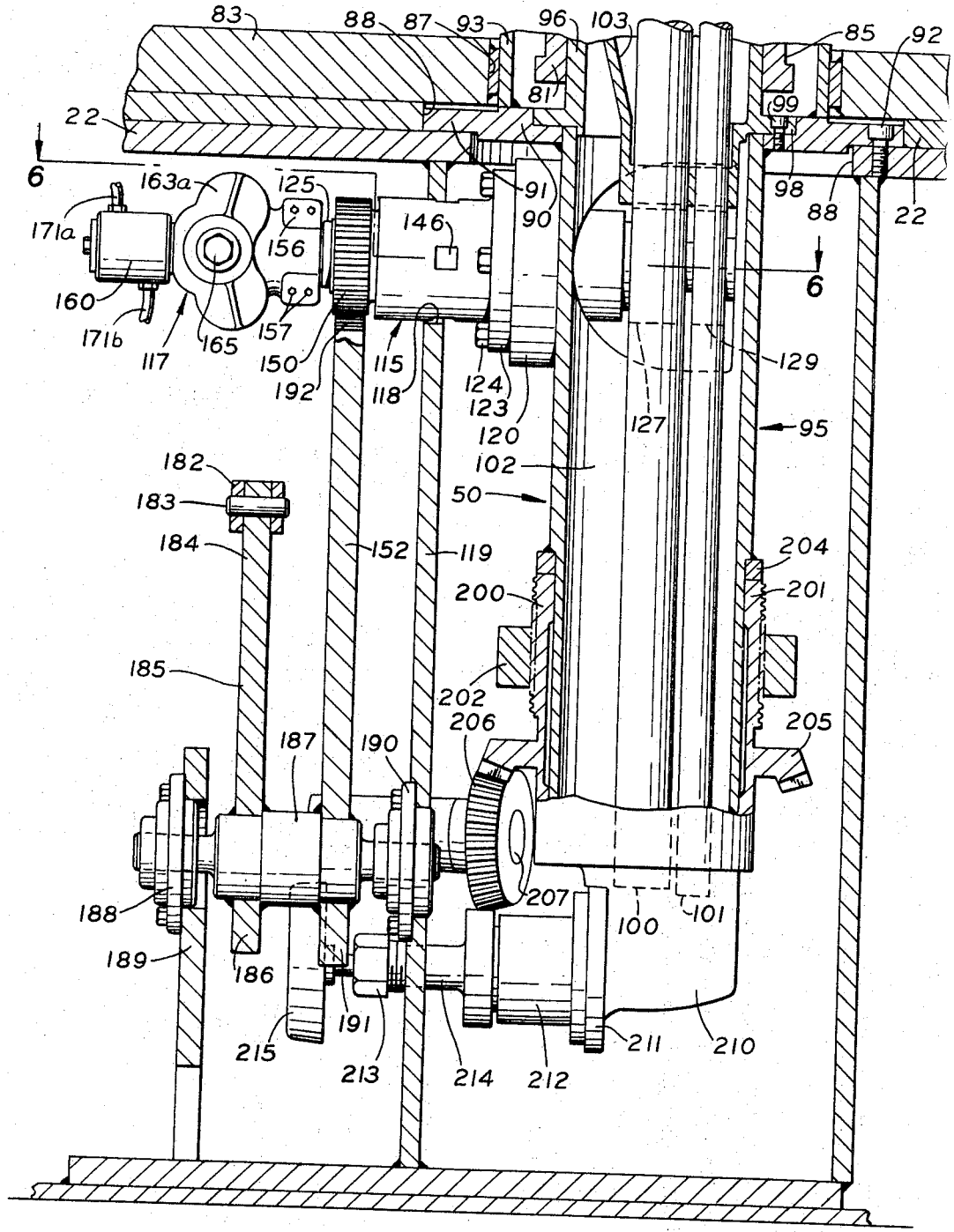
FIG. 5 is a sectional view of the center mechanism according to the invention looking toward a center mechanism from the right front side of a press.

As best shown in FIG. 5, the structural plates of the press base 22 are also cored out as at 88, below a lower mold section 21, for mounting of the center mechanism. The entire center mechanism 50 is securely attached to the press by a mounting member 90 having a radial flange 91 extending laterally above the press base opening 88. The mounting flange 91 is attached to the press base as by a series of mounting bolts 92. The mounting member 90 also has a circular collar 93 extending upwardly through the platen opening 87 and enclosing the lower portion of the center ring 75.

The center mechanism housing 95, having an open end in comunication with the interior of a bag 51, is positioned within the press base 22 below the lower mold section 21. As best shown in FIG. 11, the open upper end of the housing 95 is movably connected with the center ring 75 by an annular member 96. The housing member 96 has an exterior surface closely fitting within the drain opening of the center ring lower portion 81. A liquid or vapor seal is provided between elements 81 and 96 as by an O-ring 97. The exterior of housing member 96 has a radial flange 98 secured to the mounting member 90 as by a series of mounting bolts 99 (see FIGS. 5 and 13).

The center mechanism housing encloses two parallel upwardly extending shafts. A "primary" shaft 100 raises and lowers the "first assembly" of plate ring 54-clamp ring 55 during the operations of cured tire stripping and discharge and uncured tire band loading and shaping. A "secondary" shaft 101 is connected to the actuator element 70 for moving the radially movable segments 62 which increase the effective diameter of the bag 51.

The primary shaft 100 and the secondary shaft 101 extend upwardly from within the medial portion 102 of the center mechanism housing through a manifold element 103. Vertically aligned upper and lower bores 104 through the manifold 103 locate the primary shaft 100 coaxial of the housing 95. The secondary shaft 101 is located to the side of the primary shaft by vertically aligned upper and lower manifold bores 105.

The manifold element 103 also serves to introduce the curing media (high pressure steam and/or hot water according to the press users service facilities) into the interior of the bag 51 from the open upper end of the housing 95. As shown in FIG. 11, the manifold 103 discharges curing media through a series of orifices 106. The curing media is supplied to the manifold 103 as through a supply orifice 107 and a service line 108 (see FIG. 6). The manifold element 103 is preferably as shown, a metal casing integral with the annular housing member 96, although it could be fabricated separately and welded in place at the upper end of the housing 95.

Referring again to FIG. 11, the upper end 110 of the primary shaft has a reduced diameter and is inserted in the axial bore of the upper plate ring hub portion 56. The primary shaft end 110 is positively attached to the "first assembly" as by a bolt and washer 111. The upper end of the secondary shaft 101 is connected to the actuator element 70, which is slidable longitudinally along the primary shaft 100, as by a cap head portion 112 inserted in a receiving notch 114 on the bottom surface of the actuator 70.

The functions of the shafts 100 and 101, their movement relative to each other and to the other elements of the center mechanism 50, are explained in detail below. The shafts 100 and 101 are moved to perform these functions by a unitary or common drive mechanism indicated generally by the numeral 115. In the preferred embodiment of the invention, a power means such as a high pressure double acting cylinder indicated at 116, moves the primary shaft 100 through the drive mechanism 115. A separate power means such as a lower pressure rotary actuator, indicated at 117, acts through the drive mechanism 115 to provide for movement of the secondary shaft relative to the primary shaft.

Figure 6:
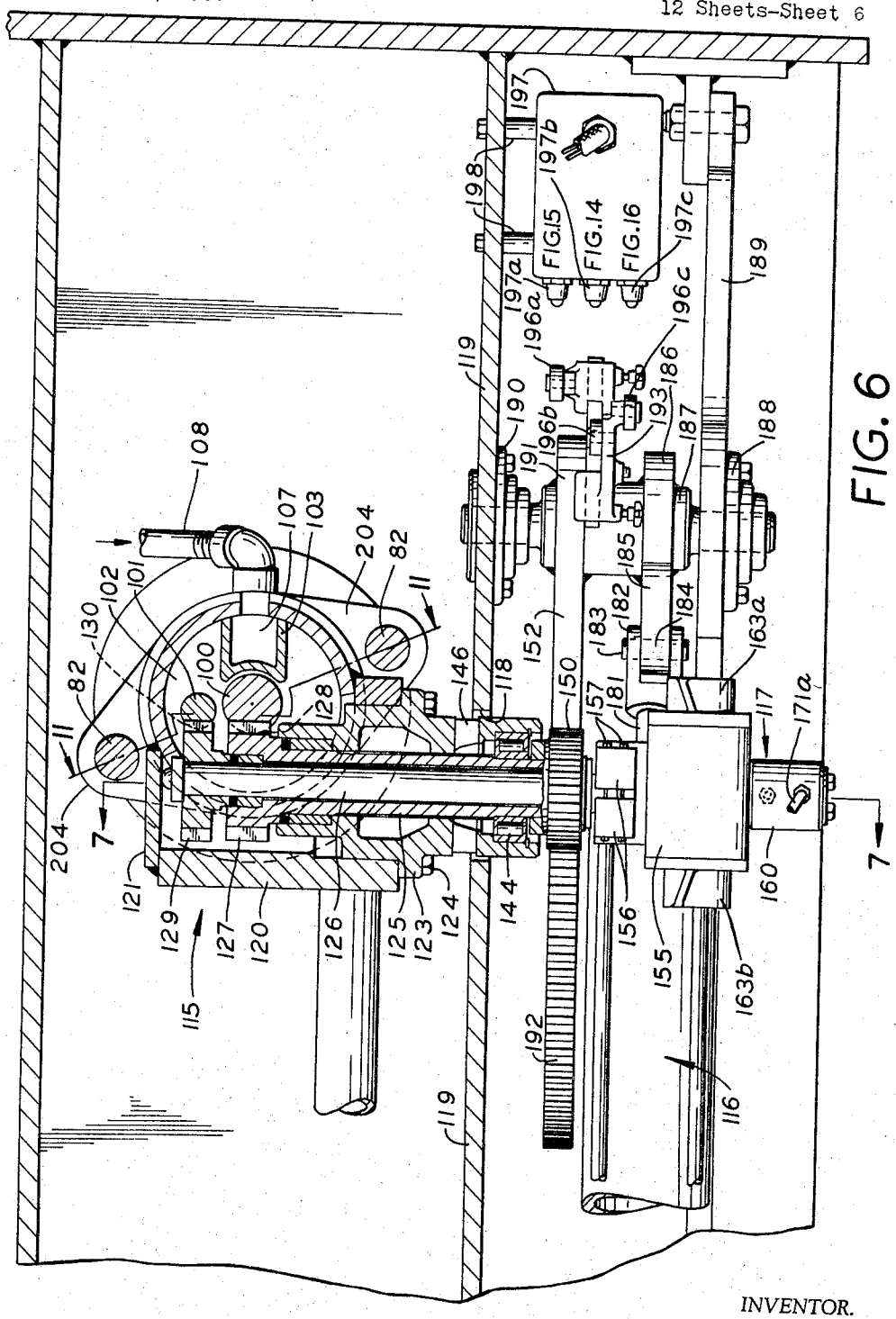
FIG. 6 is a top view of the center mechanism taken substantially as indicated on line 6—6 of FIG. 5.
Figure 7:
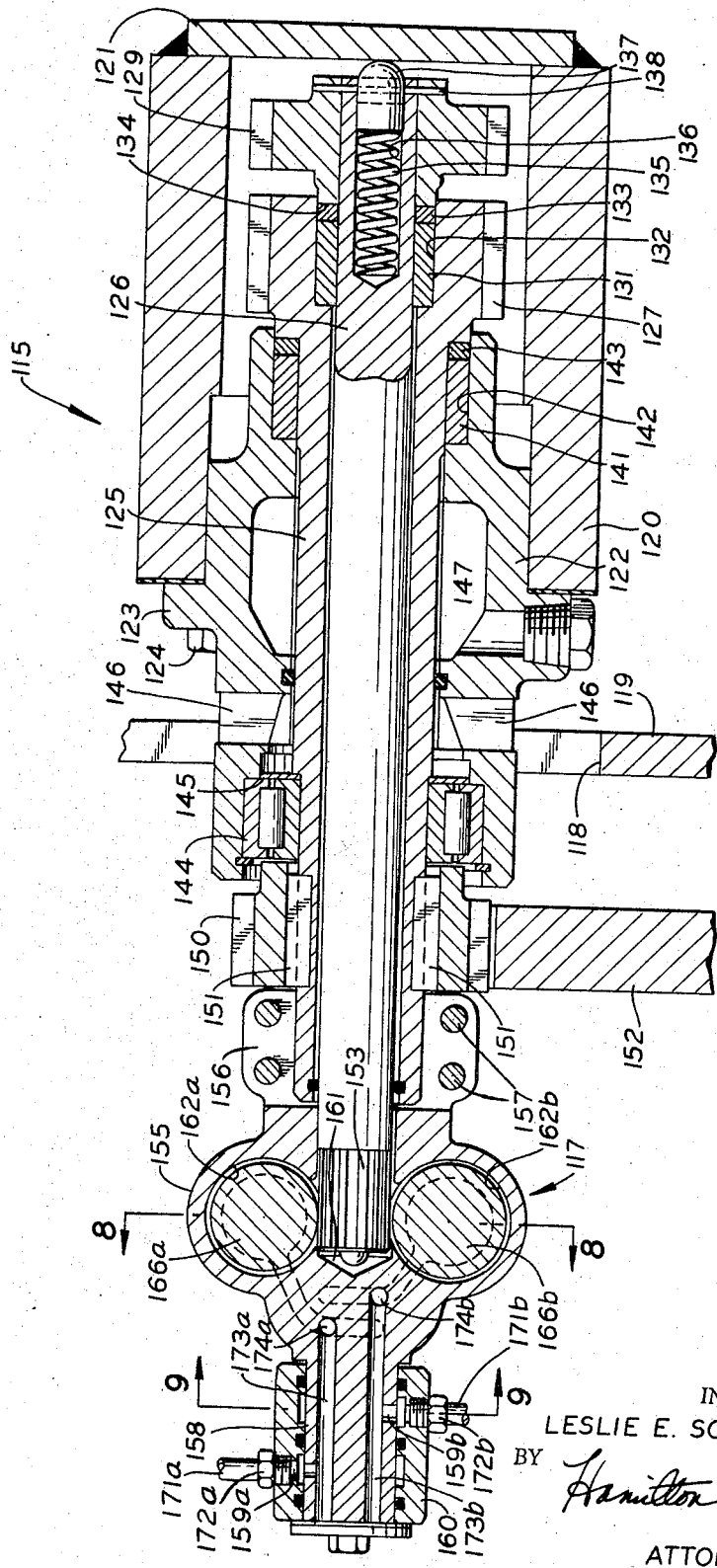
FIG. 7 is a sectional view from the side, taken substantially as indicated on line 7—7 of FIG. 6, through the middle of the unitary drive mechanism for actuating the primary and secondary shafts of the center mechanism.

Referring to FIGS. 5, 6 and 7, the unitary drive mechanism 115 extends transversely of the medial portion 102 of the center mechanism housing, through an opening 118 in a vertical press base plate 119, to the front of the press. The drive mechanism 115 has a generally cylindrical outer shell 120 closed by an end plate 121 and integrally secured, as by welding to the wall of housing portion 102. The outer facing end of the shell 120 is closed by a drive hub 122 having a radial flange 123 fastened to the shell 120 as by bolts 124.

The drive hub 122 has an axial bore rotatably mounting a coaxial assembly of a primary drive shaft 125 and a secondary drive shaft 126. At the inner end of drive shaft 125 is primary output gear 127 engaging rack teeth 128 extending longitudinally along one side of the primary shaft 100. At the inner end of drive shaft 126 is an output gear 129, having the same pitch as gear 127, engaging rack teeth 130 extending longitudinally along one side of the secondary shaft 101.

As best shown in FIG. 7, the drive mechanism 115 is so constructed that the shaft operating elements therein will not be affected by or become deteriorated from contact with the curing media supplied to the interior of the bag 51. Between the drive shafts 125 and 126 is a bearing 131, of graphite or an equivalent material, seated within an axial recess 132 in the gear 127. A liquid or vapor face seal 133 is fitted around the secondary drive shaft 126 between the bearing 131 and an inner hub face 134 of gear 129. The seal 133 is maintained under compression seating against the bearing 131 as by a coiled spring 135 seated in a short axial bore 136 at the inner end of the secondary drive shaft 126. The spring 135 is confined within bore 136 as by an axially movable plunger 137 secured by a transverse lock pin 138. The primary drive shaft 125 and the inner end of the axial bore of the drive hub 122 have a similar bearing 141 seated within an axial recess 142 in the drive hub 122. A liquid or vapor face seal 143 is fitted around the primary drive shaft 125 between the bearing 141 and an inner hub face of gear 127. When curing media is introduced into the center mechanism, the pressure thereof forcing output gears 129 and 127 against the already compressed seals 133 and 143 will further increase the effectiveness of the seals.

At the outer end of the bore of the drive hub 122, the primary drive shaft 125 is rotatably journaled in a roller bearing 144. The inner face of the bearing has a closure 145. Inwardly of the closure 145, the drive hub 122 has a series of radial vent holes 146. Inwardly of the vent holes 146 still another seal 147 may be fitted around the primary drive shaft 125. In the event liquid or vapor should escape from within the center mechanism housing and pass by the several seals 133, 143, and 147, the vent holes 146 will provide an exhaust to atmosphere and the roller bearing 144 would be protected.

The power input from the cylinder 116, to raise and lower the primary shaft 100, is transmitted into the drive mechanism 115 through an input drive means such as a gear 150. The gear 150 is securely attached coaxially on the primary drive shaft 125, outwardly of the journal bearing 144, as by dual keys 151. The gear 150 engages the teeth of a gear segment 152 controlling the power application from cylinder 116, as described in detail below.

The power input from the rotary actuator 117, providing for movement of the secondary shaft 101, is transmitted into the drive mechanism 115 through an axial spline gear 153 on the outer end of the secondary drive shaft 126. The actuator 117 has two selective or alternate functions: The passive or static function of locking the secondary drive gear 129 for synchronous or following movement with the primary drive gear 127 during press opening and tire stripping. The active or dynamic function of moving the secondary drive gear 129 independently of and in the opposite direction from movement by the primary drive gear 127 during cured tire discharge, uncured tire band loading, initial tire band shaping, and press closing for final shaping and curing.

As best shown in FIG. 7, the rotary actuator 117 has a housing with a middle portion 155 rotatable of the drive mechanism 115 on the axis of the secondary drive shaft 126. The actuator housing portion 155 has a clamp flange 156, securely attached to the primary drive shaft 125 outwardly of the input drive gear 150, as by clamp bolts 157. The outer end 158 of the actuator housing 155 is round having circumferentially continuous fluid pressure conduits 159a and 159b communicating with the fluid pressure passages of a suitably attached rotary valve 160.

Figure 8:
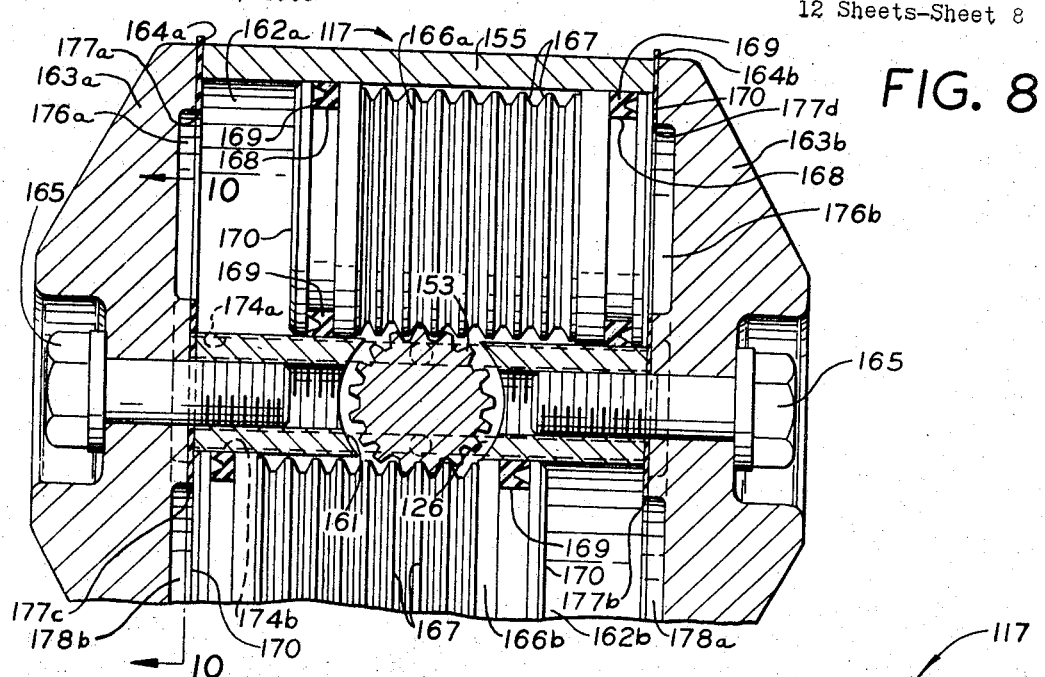
FIG. 8 is an enlarged view, taken substantially as indicated on line 8—8 of FIG. 7, showing details of the rotary actuator for the secondary shaft.

Referring also to FIG. 8, the spline gear end 153 of the secondary drive shaft 126 enters or is received within the middle housing portion 155 through a short axial bore 161. The axial bore 161 terminates between two parallel relatively large diameter transverse housing bores 162a and 162b. The sides of the middle housing portion 155 are closed by plates 163a and 163b and sealed by conduit gaskets 164a and 164b. The assembly of middle housing 155, end plates 163 and gaskets 164 are held together as by bolts 165.

The parallel or dual housing bores 162 of the rotary actuator 117 enclose two double acting pistons, 166a and 166b. The parallel or dual pistons 166 are in positive mechanical contact with opposite sides of the secondary drive shaft 126. As shown, each piston 166 has a series of circumferentially continuous rack gear teeth 167 engaging the spline gear 153 on the outer end of the secondary drive shaft 126.

The pistons 166 are actuated, simultaneously and in opposite directions, by fluid pressure introduced into their respective bores 162 from the actuator valve 160. Preferably, both ends of each piston 166 have an annular groove 168 to receive a pressure seal 169. When a piston 166 is at either end of its bore 162, the piston end 170 is in contact with a conduit gasket 164.

Figure 9:
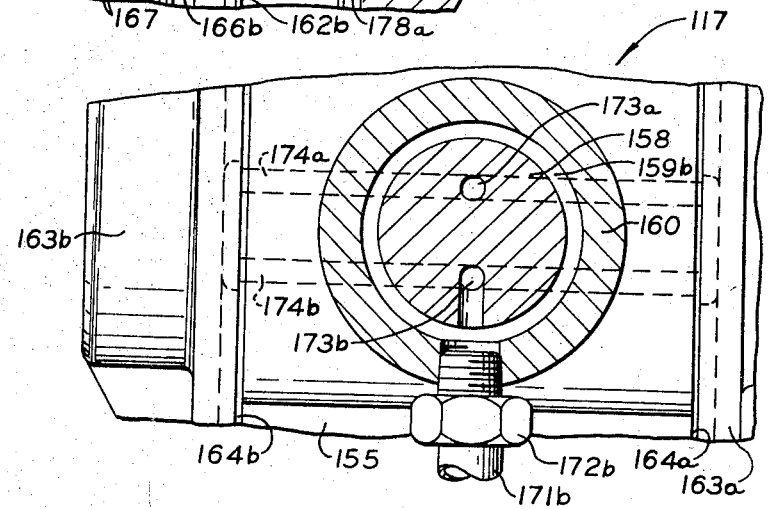
FIG. 9 is another enlarged view, taken substantially as indicated on line 9—9 of FIG. 7, showing further details of the rotary actuator for the secondary shaft.

Referring also to FIGS. 7 and 9, the circular conduits 159a and 159b in the rotary valve 160 are in communication with external fluid pressure supply conduits 171a and 171b through conduit connectors 172a and 172b. The supply conduits 171 may be of rigid piping securely affixed to the lower press plate 119.

The fluid conduit 159a communicates with a straight conduit 173a extending longitudinally through the outer conduit housing end 158 into the interior of the middle housing 155. Within the housing portion 155, the conduit 173a communicates with a transverse conduit 174a. The transverse conduit 174a extends the width of the middle housing 155 and communicates at either end with conduits 175 formed in the inner face surface of each housing side plate 163.

Figure 10:
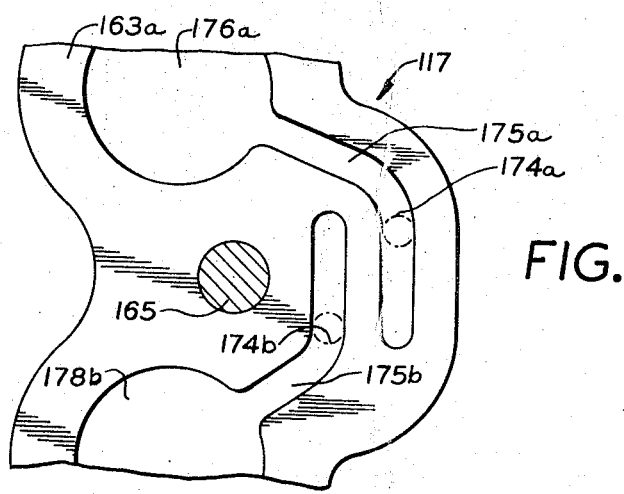
FIG. 10 is taken substantially as indicated on line 10—10 of FIG. 8.

As shown in FIG. 10, a side plate conduit 175a extends radially of the transverse conduit 174a and opens into a circular recess 176a in the side plate 163a. The conduit gasket 164a has an opening 177a corresponding to recess 176a and another opening (not shown) corresponding to conduit 175. Therefore, fluid pressure from supply piping 171a and passing through connector 172a, circular conduit 159a, straight conduit 173a, transverse conduit 174a, plate conduit 175a and into recess 176a, will pass through gasket opening 177a and exert pressure against a piston end 170 to cause the piston 166a to move to the opposite end of bore 162a (to the right, as shown in FIG. 8).

In the drawings, particularly FIG. 10, only the housing side plate 163a is shown in elevation. The housing side plate 163b has a conduit (not shown), identical with conduit 175a, communicating with a circular recess 178a at the end of piston bore 162b. The conduit gasket 164b has an opening 177b corresponding to recess 178a. Therefore, fluid pressure from supply piping 171a, passing through the intermediate conduits 172a, 159a, 173a and 174a, will pass through gasket opening 177b and exert pressure against a piston end 170 to cause the piston 166b to move to the opposite end of bore 162b (to the left, as shown in FIG. 8).

The simultaneous movement of the pistons 166 in opposite direction within the piston bores 162 will exert a strong mechanical rotative force on the secondary drive shaft 126 (a clockwise rotation of shaft 126 as viewed in FIG. 8).

Rotation of the secondary drive shaft 126 in the opposite direction (a counterclockwise movement as viewed in FIG. 8) is achieved by the "double-acting" construction of the pistons 166. Fluid pressure from supply piping 171b, passing through connector 172b and circular conduit 159b and then through a straight conduit 173b into a transverse conduit 174b, and further through a side plate conduit 175b into a recess 178b (see FIG. 10), and then into the piston bore 162b through a gasket opening 177c, would move the piston 166b away from the housing side plate 163a (to the right, as viewed in FIG. 8).

Similar conduits, including a side plate recess 176b and a gasket opening 177d, would simultaneously transmit fluid pressure from transverse conduit 174b to move the piston 166a toward the housing side plate 163a (to the right, as viewed in FIG. 8).

It will be understood that the various fluid pressure supply conduits, recesses and openings as described above, numbered 159a and 159b, and 171a through 178b, inclusive, are illustrative only. Alternative or additional actuator conduits, including conduits for relief or venting of the ends of piston bores 162 during approach of the pistons 166, could be provided as desired so long as a strong rotative "double-acting" force is applied to the secondary drive shaft 126 of the drive mechanism 115.

As has been generally described above, the power input from the double-acting cylinder 116 moves the primary shaft 100 of each center mechanism 50 through the drive mechanism 115. Each cylinder 116 is connected by suitable supply conduits (not shown) to a source of fluid pressure. The primary drive shaft 125, the output drive gear 127, the input drive gear 150 and the control gear segment 152 have been previously identified. Referring to FIG. 1, the base end of each cylinder 116 is movably attached to a bracket assembly 180 mounted on the vertical press base plate 119. The piston rod 181 of a cylinder 116 carries a clevis 182 for attachment as by a pin 183 to the upwardly extending end 184 of a lever arm 185.

The lower or hub end 186 of each lever arm 185 is securely attached to a horizontal base shaft 187. As best shown in FIGS. 5 and 6, the outboard end of a base shaft 187 is rotatably journaled in a bearing block 188 carried by a facing bracket 189 extending across the front of the press and attached to the press frame. The inboard end of each base shaft 187 is rotatably journaled in a bearing block 190 carried on the press base plate 119. The lower end or apex 191 of each control gear segment 152 is securely attached to a shaft 187 between the lever arm 185 and the bearing block 190.

Each control gear segment 152 extends upwardly away from the base shaft 187 in a general fan shape. The upper or widest edge of a segment 152 may have integral gear teeth 192 which engage the teeth on a primary input drive means or gear 150. Movement of the gear segment 152 to raise or lower the primary shaft 100, in response to extension or retraction of the piston rod 181 of cylinder 116, may be electrically controlled by a series of switch actuators carried on a control segment 193 attached to the apex portion 191 of a gear segment as by bolts 194.

Figure 3:
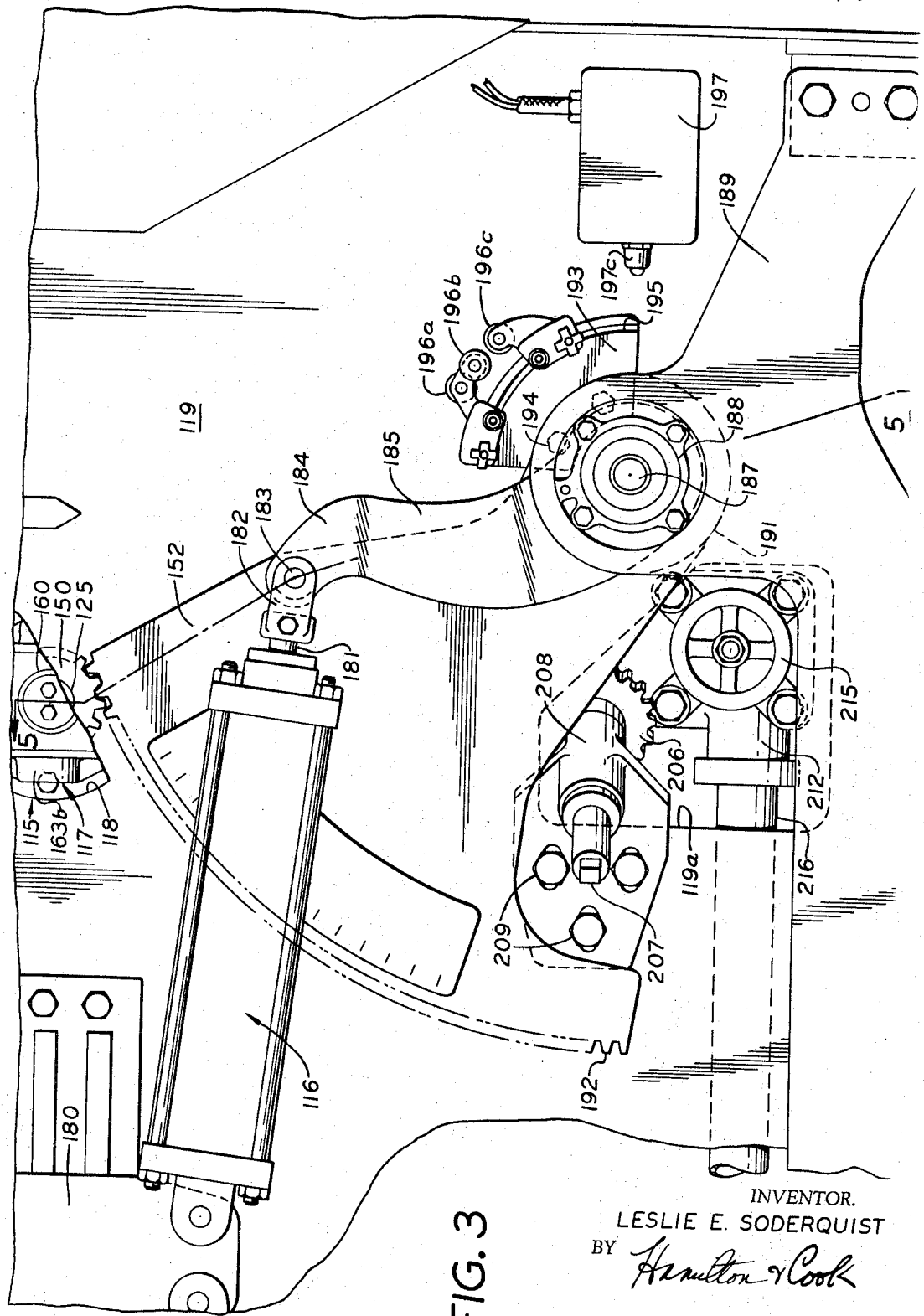
FIG. 3 is an enlarged front view of the right side front face of the press of FIG. 1, showing details of the center mechanism and controls therefor when the press is closed.
Figure 4:
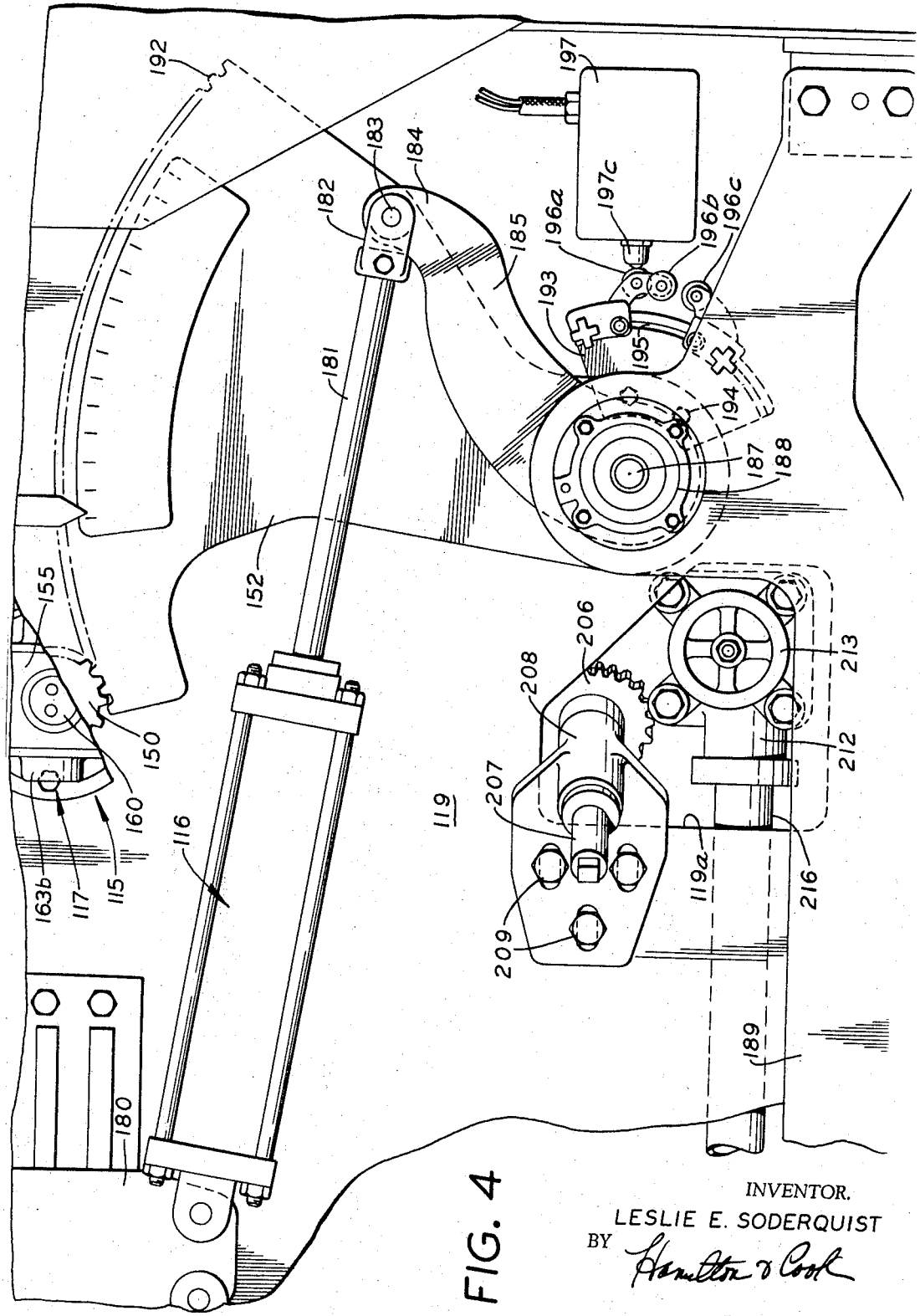
FIG. 4 is another enlarged front view, like FIG. 3, showing details of the center mechanism and controls therefor when the press is ready for discharge of a cured tire.

As best shown in FIGS. 3 or 4, a control segment 193 has an arcuate slot 195 permitting adjustable mounting of a series of switch actuators or strikers carrying contact rollers 196. Referring also to FIG. 6, as shown there are three rollers, 196a, 196b and 196c, variously positioned along the control segment slot 195, to sequentially strike and close three corresponding contact buttons, 197a, 197b and 197c, on multiple electrical switch 197, attached as by stub brackets 198 to the press base plate 119. As explained in further detail below, the switch 197 for each center mechanism 50 is electrically connected with the fluid pressure supply piping (not shown) for each cylinder 116 to control the movement of the primary shaft 100 during the various press operations.

As has been generally described above, the center ring 75 is clamped in bag closing engagement with the lower bead ring 76 by the clamp rods 82. The clamp rods 82 are raised and lowered by actuating means or elements carried on the center mechanism housing 95. As best shown in FIG. 11, a circular sleeve 200 is rotatably mounted on the lower end of the medial housing portion 102. The housing sleeve 200 has an upper portion with a continuous circumferential thread 201. The continuous thread 201 engages with matching internal threads of a clamp rod pull-down ring 202. The lower end of each clamp rod 82 is securely fastened to the pull-down ring 202 as by lock bolts 203. A ring bracket 204 securely attached transversely of the housing portion 202 above the circular sleeve 200 has suitable bores for receiving and stabilizing the clamp rods 82 when the center ring 75 is unclamped for change or replacement of a bag 51.

The circular sleeve 200 may be rotated to move the clamp rod ring 202 longitudinally of the center mechanism housing by a bevel gear 205. The bevel gear 205 is preferably on the sleeve below the circumferential thread 201. The bevel gear 205 is rotated by a mating bevel gear 206 mounted on the end of a shaft 207 extending through an access opening 119a in the vertical press base plate 119 to the front of the press. The gear drive shaft 207 is carried by a bearing bracket 208 attached to the press base plate 119 as by bolts 209.

As has been generally described above, at the end of a press curing cycle, the condensate from the curing media will flow into the basin 80 of the center ring 75 and drain into the center mechanism housing. As best shown in FIG. 5, the bottom end of the medial housing portion 102 is closed by a securely attached drain sump member 210. The housing sump 210 preferably has an opening directed toward the front of the press and the vertical press base plate 119. A collar 211 around the sump opening serves to mount a short drain pipe section 212. A manual shut-off valve 213, having a stem portion 214 extending through the press base plate 119 and a handle 215, may be installed on the pipe section 212 to close the sump. Referring to FIG. 1, the center mechanism sump members 210 may be connected by a crosspipe 216 having a remotely operated valve (not shown) for discharge of the condensate to a common service drain (also not shown).

*Press operation*

Referring to FIGS. 1 and 11, when the press mold sections 20 and 21 are closed a center mechanism 50 is in curing relation to a tire T, the bag 51 is radially distended within the shaping and curing tire, and curing media is being introduced through the manifold element 103 and service line 108. The primary shaft 100 is located at its lowermost position within the center mechanism housing 95 for the particular size tire being cured. The secondary shaft 101 has been raised until the actuator 70 is received in the recess 57 in the hub portion of the upper plate ring 54.

The FIGS. 1 and 11 position of the secondary shaft 101 is reached by supplying fluid pressure to the rotary actuator 117 so that the dual pistons 166 are displaced (as to the position of FIG. 8), rotating the secondary drive shaft 126 and drive gear 129, raising the secondary shaft 101 and moving the segments 62 radially outwardly expanding the bag.

At the end of a curing period, a suitable control means such as a timer (not shown) will actuate the press drive, including the bull gears 41 and side links 40, and the press will begin to open. Prior to opening, the press control means has cut off supply of curing media to manifold element 103, and has opened the valve in line 216 connecting the housing sumps 210 to drain.

As the press opens, the center mechanism 50 is operated to strip the cured tire from the lower mold section 21 and to position the tire as shown in FIG. 14 for engagement by suitable apparatus for discharge of the tire from the press. The lifting arms of a tire discharge mechanism are indicated generally at 220. Details of a suitable mechanism for moving the lifting arm 220 for removal or discharge of the tire from the press have not been shown herein; reference being made to prior art patents of the inventor, including United States Patents No. 2,832,991, No. 2,832,992, No. 2,911,670 and No. 3,141,191, for such details of suitable mechanisms as are required to more fully understand the invention.

Referring still to FIG. 14, at any desired time while the press is opening by relative movement of the mold sections, so long as the position of an upper mold section 20 will not interfere, the primary shaft 100 and the secondary shaft 101 are moved together and raised within the center mechanism housing 95. The primary shaft 100 is raised by the drive mechanism 115 when the cylinder 116 is actuated to extend a piston rod 181. Raising of the shaft 100 is stopped in a predetermined position when an electrical switch 197 is actuated by movement of the control segment 193. Referring also to FIG. 6, the FIG. 14 position could be established by contact of the roller 196b with electrical switch 197b.

As described above, the primary drive shaft is mechanically coupled with the actuator housing 155 by the clamp flange 156. As the primary shaft 100 is raised from the position of FIG. 11 (press closed) to the position of FIG. 14, maintenance of the pressure on the dual pistons 166 of the actuator 117 will lock the axial spline gear 153 so that the secondary drive shaft 126 and gear 129 will follow the rotation of gear 127 raising the secondary shaft 101 along with the primary shaft 100.

When the cured tire T is ready for discharge from the press by the lifting arms 220, the center mechanism 50 will be in the condition of FIG. 15, the supply of fluid pressure to the actuator pistons 166 having been reversed unlocking the secondary shaft 101. Preferably simultaneously, the cylinder 116 is again actuated to fully extend the piston rod 181 and the gear segment 152 is further moved so that the gear 150 will further raise the primary shaft 100 an additional short distance. The raising of the shaft 100 to the uppermost position is stopped when an electrical switch 197 is actuated by movement of the control segment 193. As shown in FIGS. 4 and 6, the FIG. 15 position could be established by contact of the roller 196a with electrical switch 197a.

Unlocking of the primary shaft 101 will result in moving the actuator 70 longitudinally away from the plate ring recess 57. When the actuator surface 72 is not in or is out of contact with the segments 62, the normal or inherent resiliency of the bag 51, when the bag is fully elongated, will cause the segments to collapse or move radially inwardly to their smaller diameter position and the effective diameter of the entire bag will be decreased to the diameter of the plate rings 54 and 75.

Referring to FIG. 16, the left hand mold section is shown as having been loaded with a radial ply tire band and the right hand mold section as having been loaded with a conventional bias ply tire band. In the shaping of radial ply tires, it is important that the bag 51 be properly inserted with the semi-toroidal interior of the tire band before the upper bead is contacted by the closing mold section 20.

For a radial ply tire band, prior to press closing, the primary shaft 100 is lowered to a predetermined position such that the upper plate ring 54 is approximately level with the upper bead. Lowering of the shaft 100 is stopped when an electrical switch 197 is actuated by movement of the control segment 193. Referring again to FIG. 6, the FIG. 16 position could be established by contact of the roller 196c with electrical switch 197c.

For a conventional tire band, the primary shaft 100 may be lowered without stopping, directly to the final shaping and curing position of FIG. 11.

During downward movement of the primary shaft 100, the pressure is maintained on the actuator pistons 166 so that the actuator surface 72 will remain out of contact with the segments 62.

FIG. 17 shows the radial ply tire of FIG. 16 in the same condition as the conventional tire, ready for final shaping and curing.

The above description and accompanying drawings, and the brief summary of press operation are considered sufficient to enable one skilled in the art to understand the principles and workings of the press and center mechanism 50 according to the invention. However, it will be appreciated that the details are not essential and may be modified or varied, as in the embodiments disclosed, within the scope of the advance in the art and the appended claims. Further, no showing has been made of any wiring diagram and switches by which closing and opening of the press, admission of the shaping and curing media, introduction of fluid pressure into the cylinder 116 or actuator 117, etc., may be automatically controlled, since such details may be readily designed by any qualified electrical engineer when the sequence of operations as described herein is understood.

What is claimed is:

1. A permanent bag center mechanism (50) for a press having opposed separable mold sections, said center mechanism being carried by an extending axially of one of said mold sections, the bag of said center mechanism being a deformable radially distensible cylinder open at both ends and having opposed first and second assemblies for closing the ends thereof, said first assembly being movable longitudinally of said second assembly, said second assembly being integrally associated with a mold section, there being radially movable elements carried on the surface of said first assembly facing said second assembly and interiorly of said bag and an actuator element interiorly of said bag for selectively moving said radially movable elements to increase the effective diameter of that portion of the bag, adjacent the first assembly, characterized in that, said center mechanism has a housing (95) with an open end in communication with the interior of said bag, said housing encloses two parallel shafts, comprising a primary shaft (100) located coaxial of the housing and connected at one end (110) to said first assembly and a secondary shaft (101) located to the side of the primary shaft and connected to said actuator element (70), and said housing has a unitary drive mechanism (115) extending transversely thereof for selectively moving said shafts.

2. A center mechanism, according to claim 1, wherein said press has opposed and separable upper and lower mold sections (20, 21), said second assembly is integrally associated with said lower mold section (21), and said housing (95) is positioned within a press base (22) below said lower mold section.

3. A center mechanism, according to claim 2, wherein said second assembly includes an upper center ring (75) and a lower bead ring (76), said bead ring having a large diameter center opening, said center ring having an axial portion (80) which extends downwardly toward said press base (22) through the opening in said bead ring, said axial portion having sloping or curving sides forming a basin or center well axially of the lower mold section (21).

4. A center mechanism, according to claim 3, wherein said center ring basin (80) opens into said housing (95) and the lower end of said housing has a sump member (210), said sump member being connected to a drain for discharge of condensate from curing media collected in said basin at the end of a press curing cycle.

5. A center mechanism, according to claim 3, wherein said center ring (75) has a lower portion (81) releasingly engaging upwardly extending rods (82) for clamping the center ring in bag closing engagement with said bead ring (76), the lower end of said clamp rods (82) being raised and lowered by actuating means (200–204) carried on the housing (95) within the press base (22).

6. A center mechanism, according to claim 1, wherein said drive mechanism (115) has a coaxial assembly of a primary drive shaft (125) and a secondary drive shaft (126), said primary drive shaft having an output gear (127) engaging rack teeth (128) extending longitudinally along one side of said primary shaft (100), said secondary drive shaft having an output gear (129) engaging rack teeth (130) extending longitudinally along one side of said secondary shaft (101).

7. A center mechanism, according to claim 6, wherein said primary drive shaft (125) is driven by power from a double acting cylinder (116), and the power input from said cylinder is transmitted into the drive mechanism (115) by an input drive means (150) on said primary drive shaft.

8. A center mechanism, according to claim 7, wherein the input drive means (150) is a gear securely attached coaxially on the primary drive shaft (125) and said gear (150) engages the teeth of a gear segment (152) controlling the power application from said cylinder (116), and said gear segment (152) has means (193, 196) there on to control extension or retraction of a piston rod (181) in said cylinder to raise or lower said primary shaft.

9. A center mechanism, according to claim 7, wherein said secondary drive shaft (126) is driven by power from a rotary actuator (117), said actuator having a housing portion (155) rotatable on the axis of said secondary drive shaft, said actuator housing portion being securely attached (156, 157) to said housing, there being means (166) within said actuator housing portion to selectively lock said secondary drive shaft (126) so that the output gear (129) will follow rotation of output gear (127) moving said secondary shaft (101) along with movement of said primary shaft (100).

10. A center mechanism, according to claim 6, wherein said secondary drive shaft (126) is driven by power from a rotary actuator (117), and the power input from said actuator is transmitted into the drive mechanism (115) through an end (153) of said secondary drive shaft.

11. A center mechanism, according to claim 10, wherein said rotary actuator (117) has a housing (155) enclosing two double acting pistons (166a, 166b) in positive mechanical contact with opposite sides with the end (153) of said secondary drive shaft.

12. A center mechanism, according to claim 1, wherein said press has opposed and separable upper and lower mold sections (20, 21), said press has a base with structural plates cored out to provide an opening (88) below said lower mold section (21), and said center mechanism is securely attached to the press by a mounting member (90) having a radial flange (91) extending laterally above said press base opening (88).

13. A center mechanism, according to claim 1, wherein said press has opposed and separable upper and lower mold sections (20, 21), said housing (95) is positioned within a press base (22) below said lower mold section (21), said primary shaft (100) and secondary shaft (101) extending upwardly from within the housing through a manifold element (103), said manifold element serving to introduce curing media into the interior of the bag (51) from the open upper end of the housing (95).

References Cited

UNITED STATES PATENTS 3,260,782   7/1966   Soderquist.

J. SPENCER OVERHOLSER, *Primary Examiner.*

J. HOWARD FLINT, JR., *Examiner.*